United States Patent
Chong et al.

(10) Patent No.: US 6,800,324 B2
(45) Date of Patent: Oct. 5, 2004

(54) PLASTIC COMPONENTS WITH IMPROVED SURFACE APPEARANCE AND METHOD OF MAKING THE SAME

(75) Inventors: Kong Fok Chong, Singapore (SG); Hlwan Moe Maung Zaw, Singapore (SG); Tuck Sung Tong, Singapore (SG)

(73) Assignee: Nanyang Polytechnic (SG)

(*) Notice: Subject to any disclaimer, the term of this patent is extended or adjusted under 35 U.S.C. 154(b) by 0 days.

(21) Appl. No.: 09/814,331

(22) Filed: Mar. 21, 2001

(65) Prior Publication Data

US 2001/0043990 A1 Nov. 22, 2001

(30) Foreign Application Priority Data

Mar. 21, 2000 (SG) ........................................ 200001595-8

(51) Int. Cl.[7] .............................. B05D 1/38; B05D 5/02
(52) U.S. Cl. ..................... 427/261; 427/264; 427/430.1
(58) Field of Search ................................ 427/261, 264, 427/265, 271, 284, 421, 430.1, 307, 554–555, 558; 156/307.3, 155

(56) References Cited

U.S. PATENT DOCUMENTS

| | | | | |
|---|---|---|---|---|
| 3,911,170 A | * | 10/1975 | Honjo et al. | 427/140 |
| 4,980,235 A | * | 12/1990 | Scheer et al. | |
| 5,470,609 A | * | 11/1995 | Leach et al. | 427/140 |
| 5,525,370 A | * | 6/1996 | Hoebeke et al. | 427/195 |
| 5,937,754 A | * | 8/1999 | Scott et al. | |

* cited by examiner

Primary Examiner—Fred J. Parker
(74) Attorney, Agent, or Firm—Lawrence Y.D. Ho & Assoc.

(57) ABSTRACT

A method of treating the surface of a rough, plastic object to produce a high gloss, textured and/or coloured finish. A rapid prototype treated according to the present method assumes the appearance of an injection molded part, without the usual high costs associated with producing the injection mold. In one embodiment, first step involves of removing the pores in the porous part, at least at the outer layers of the part, followed by a smoothening process of filling the voids between the miniature steps with a hardener to give a smooth surface, on which further post-processing may be performed.

5 Claims, 3 Drawing Sheets

PLASTIC COMPONENTS WITH IMPROVED SURFACE APPEARANCE AND METHOD OF MAKING THE SAME

FIELD OF THE INVENTION

The present invention relates to the manufacture of plastic objects. In particular, the present invention relates to a method of treating porous plastic objects and products produced thereof.

BACKGROUND OF THE INVENTION

Plastic objects are commonly produced using rapid prototyping techniques for testing purposes before the more expensive permanent mold is made for mass production purposes. Different techniques and apparatus are available for producing rapid prototypes. The prototypes produced are typically made of metallic composites or plastic. For plastic prototypes, acrylic, ABS and nylon are common materials used.

Nylon prototypes are typically produced from powdered nylon using techniques such as selective laser sintering, while acrylic and ABS prototypes are produced by stereolithography and fused deposition method respectively. The prototypes produced have a high level of accuracy, but often assume a rough, mat appearance that usually does not look like their injection moulded counterparts.

Injection moulded plastic, on the other hand, may be produced with the relevant dyes added into the material for molding, and the high molding temperature and pressure causes complete melting and mixing of the plastic and dye to form a non-porous, solid part. If texturing is desired of the part, chemical etching or sanding is usually performed on the injection mold itself, such that the desired texture is automatically created on the surface of the mold during the molding process.

There is, however, presently no techniques to improve the appearance of parts produced by rapid prototyping technique (e.g. to provide surface texturing or colouring). It is therefore an object of the present invention to provide a method for improving the characteristics of porous plastic parts.

SUMMARY OF THE INVENTION

Figure 1:
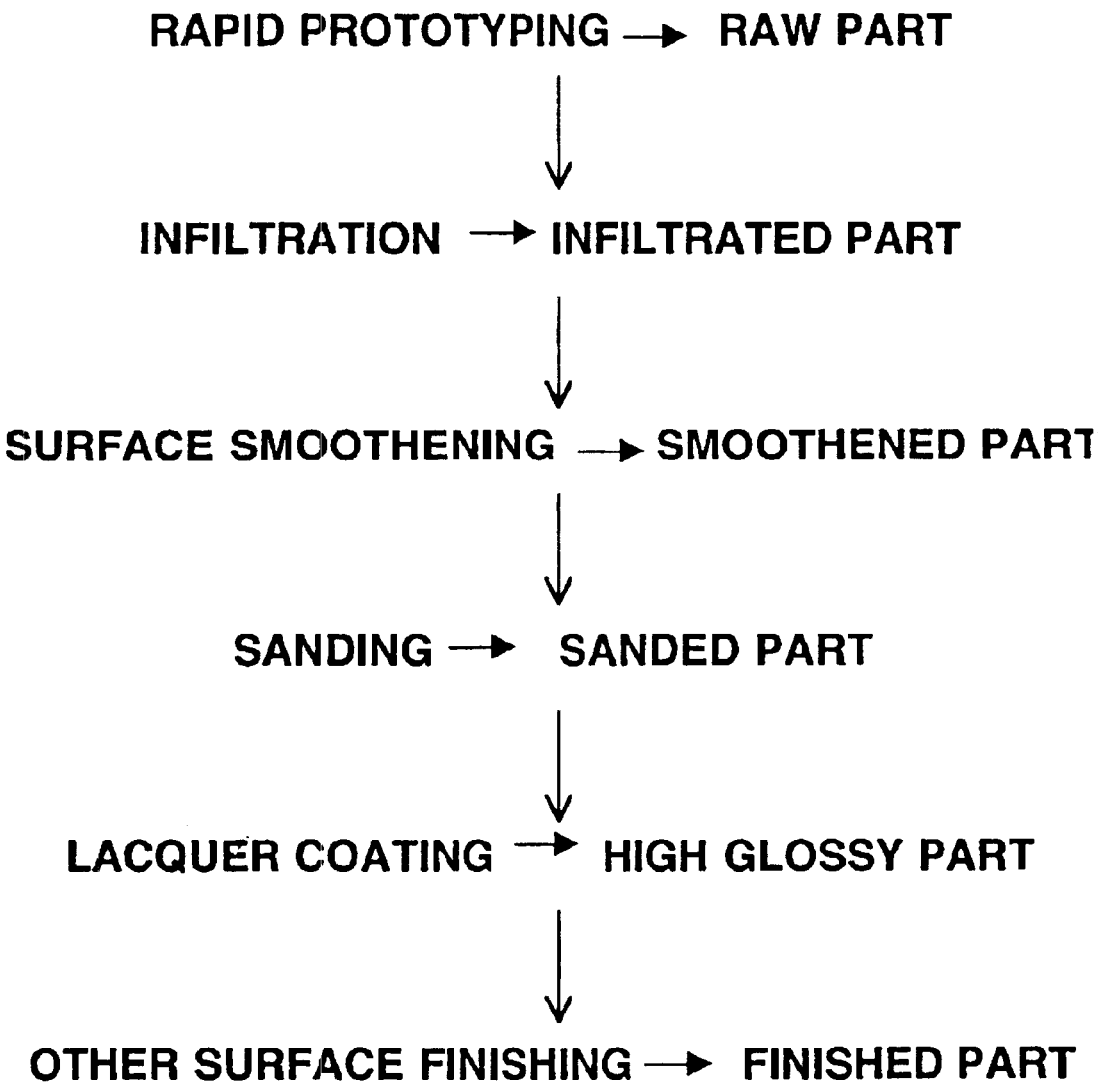
FIG. 1 is a flow chart to show the method according to the preferred embodiment of the present invention.

Accordingly, the present invention provides, in one aspect, a method of treating the surface of a rough, plastic object to produce a high gloss, textured and/or coloured finish. Thus, a rapid prototype treated according to the present method assumes the appearance of an injection molded part, without the usual high costs associated with producing the injection mold. This allows greater flexibility for manufacturers producing products in which market acceptance is highly dependent on the appearance of the molded plastic part. With the present invention, manufacturers can now obtain plastic prototypes that closely resemble the final injection molded part, and therefore can obtain better market information before investing in the permanent molds for injection molding. This method may be applied to porous, semi-porous or non-porous prototypes.

The method according to the present invention overcome two main problems presented by porous prototypes. The first problem is porosity, which causes most surface coatings to penetrate and be absorbed below the surface, giving poor coating results. The second problem is roughness, due to the presence of miniature steps caused by the layer-by-layer fusion process. To overcome these problems, the present invention provides a first step of removing the pores in the porous part, at least at the outer layers of the part, followed by a smoothening process of filling the voids between the miniature steps with a hardener to give a smooth surface, on which further post-processing may be performed.

In the preferred embodiment, the pores are removed by infiltration of a curable polymer, such as polyurethane (PU). The infiltrated part is then cured under suitable curing conditions, followed by the application of a coating of a curable hardener, such as UV lacquer (a lacquer curable by exposure to ultraviolet light). The curable lacquer is then cured under appropriate conditions to give a smoothened surface. In the most preferred embodiment, an optional step of sanding is performed on the smoothened surface to remove any residual unevenness, followed by spraying of a second lacquer to give a glossy look. The surface property of the prototype at this stage is similar to that of a smooth injection molded part. For coloured parts, spray painting may be performed. For textured parts, sanding is performed. For textured, coloured parts, a combination of sand-blasting and spray painting is performed.

The plastic product, constructed in accordance with the preferred embodiment, is made of a porous plastic part with its pore infiltrated with a reinforcement polymer or resin. The exterior surface of the product is coated with a hardener to provided a smooth surface on which standard surface finish techniques are further applied. The final products may have appearances ranging from mat, glossy, coloured to graphical prints that resemble injection molded products.

Besides providing a method for improving the finishing of a porous plastic part, the present invention also provide the unexpected benefit of increasing the strength and rigidity of the part. Thus, not only is it possible to improve the outward appearance of the rapid prototype, but the rigidity and tensile strength of the product produced according to the present invention is also improved.

The same methods as described above may be applied to treat semi-porous plastics. As for non-porous plastics, the appearance may be improved by performing the smoothening process of filing the voids between the miniature steps with a hardener to give a smooth surface on which further post-processing steps may be performed.

DESCRIPTION OF THE INVENTION

The following detailed description describes the preferred embodiment for implementing the underlying principles of the present invention. Specifically, a porous nylon prototype obtained by a standard rapid prototyping technique is used as an illustration of the application and usefulness of the present invention. One skilled in the art should understand, however, that the following description is meant to be illustrative of the present invention, and should not be construed as limiting the principles discussed herein. In the following discussion, and in the claims the terms "including", "having", "containing" and "comprising" are used in an open-ended fashion, and thus should be interpreted to mean "including but not limited to . . . ". Polymer, resin and hardener are used broadly to refer to liquid or semi-solid polymeric compounds that may be cured to formed solidified or hardened structures. Specific examples of the types of polymer used in each step are described in detail below.

Referring to FIG. 1, shows the general steps of the preferred embodiment of the present invention. Each step will be explained in greater detail below. It is appreciated that although the following specific examples describe a method of treating porous nylon rapid prototypes, the present invention may be applied to other porous plastics, particularly thermoplastics. The treatment of other rough, porous objects, that are not conducive to standard surface coating treatment, and the products derived thereof are also considered equivalents. Other non-porous plastics may also be treated according to an alternative embodiment of the present invention. It is also appreciated that once a smoothened part is obtained, various surface treatments may be applied to obtain various appearances.

Fabrication of Porous Plastic Part by Rapid Prototyping

Figure 2:
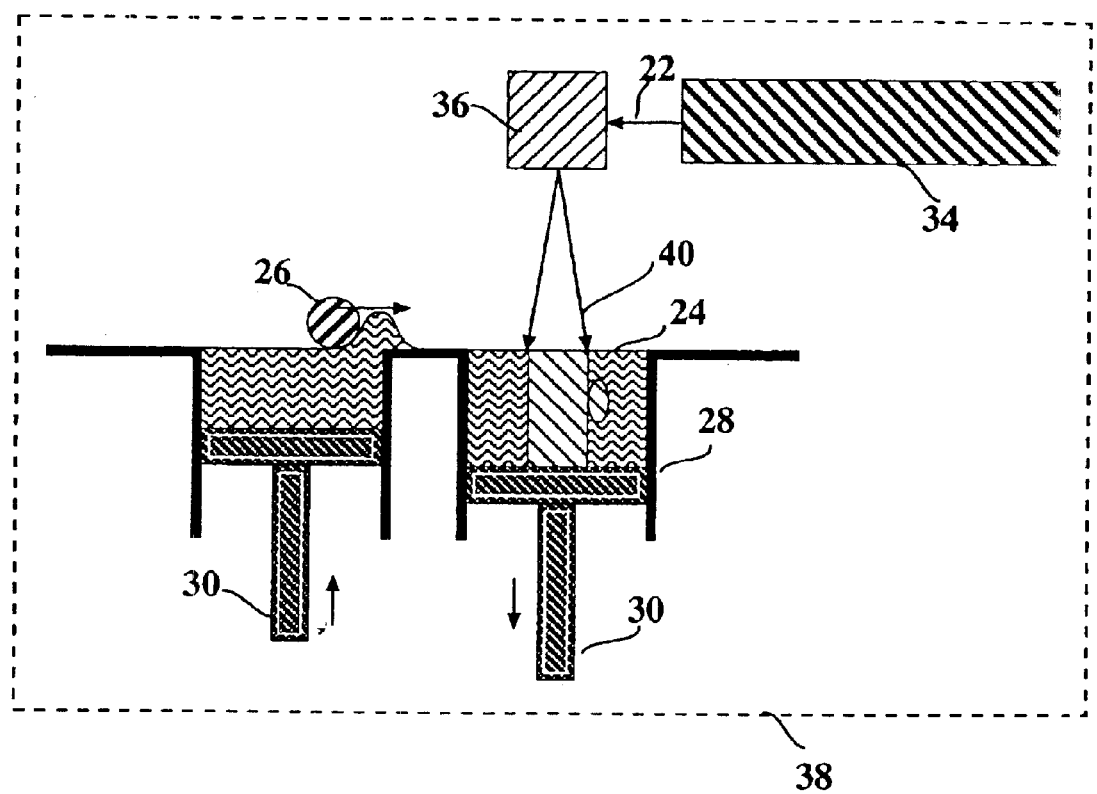
FIG. 2 is a schematic diagram to show a prior art rapid prototyping process.

A porous plastic part may be obtained, for example, by a D™ Sinterstation using the technique of selective laser sintering (SLS). In this technique, as shown in FIG. 2, a laser beam 22 is traced over a thin layer of powder 24 made of a thermoplastic material such as nylon in the build cylinder. The powder is spread by a roller 26 over the surface of a build cylinder 28. A piston 30 moves down one object layer thickness to accommodate the layer of powder. The powder is supplied to the build cylinder by the incremental upward movement of the powder delivery piston 32 and the rolling action of the roller 26. Heat from the laser melts the powder where it strikes under the guidance scanner system 36. The $CO_2$ laser 34 provides a concentrated infrared heating beam 36. The entire fabrication chamber 38 is sealed and maintained at a specified temperature. Thus, heat from the laser need only elevate the temperature to cause sintering, greatly speeding up the process. A nitrogen atmosphere is maintained in the fabrication chamber. After the part is fully formed, the fabrication piston 30 is raised to elevate the part. Excess powder from the build cylinder 28 is simply brushed and/or sanded away to obtain the raw part.

It is appreciated that the excess powder in the build chamber, although not sintered to the part during the process, is exposed to high heat levels close to the melting temperature of the material. As a result, the excess powder tend to lose part of its ability to fuse together properly to form the prototype and therefore are typically not recycled for successive uses. The part produced from recycled powder tends to be even more porous than parts produced by fresh powder. The post-processing (i.e. post-sintering) treatment according to the present invention, however, has the effect of reinforcing the part, thereby allowing recycling of excess powder.

Removal of Porosity

The pores that cause the porosity of the plastic part are removed by infiltration of a curable polymer or resin that is of a suitable molecular weight to penetrate the pores effectively, and of the right characteristics to interact with the plastic material. The raw part is soaked in a container of curable polymeric liquid infiltratant that seals up the pores, at least on the surface of the part. Once sufficient infiltration has occurred, the part is removed from the container, and the infiltrant cured under suitable conditions. The length of soaking time depends on the amount of infiltration required. Thus, if complete infiltration is required to increase strength, then a longer period for soaking is needed for thicker parts. If only surface infiltration is required, then the soaking time may be shortened.

Table 1 below shows an example of how the infiltration step is performed. The surface of the infiltrated part, however, remains almost as rough as the raw part.

TABLE 1

| Material | TrueForm polyurethane (PU) Infiltrant supplied by Zeneca Resins, Massachusetts, USA. |
|---|---|
| Process | Submerge entire part into a container with the PU for 5–30 minutes. Place part in 60° C. oven for 10–20 minutes to cure the PU. |
| Resulting Part | Surface roughness (Ra) of 7–10 $\mu$m. |

Surface Smoothening Step

Figure 3A:
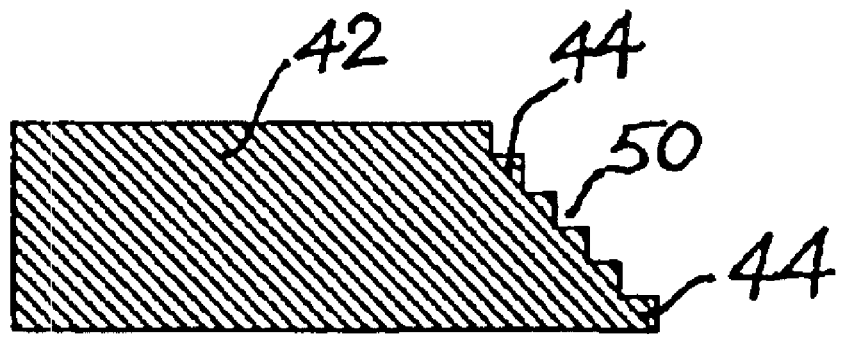
FIG. 3A is schematic diagram to show surface unevenness of a rapid prototype due to the presence of miniature steps.
Figure 3B:
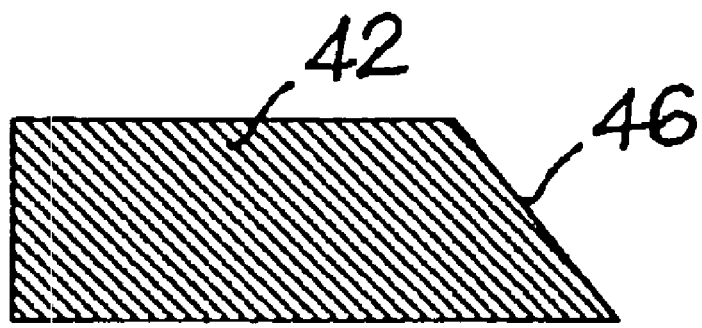
FIGS. 3B and 3C are schematic diagrams to show the same surface as FIG. 3A but after treatment according to the prior art (FIG. 3B) or the present invention (FIG. 3C).

The SLS technique described above creates the rapid prototype parts through a layer by layer heating process. Thus, a part 42 with slopes or irregular shapes will contain miniature steps 44 as shown in FIG. 3A. Although each layer can be adjusted to as low as 0.1 mm, the appearance of the raw part remains rough if post-processing is not performed. The only post-processing method in the prior art to reduce this stepping effect is to sand down manually to form an even slope 46 as illustrated in FIG. 3B. This takes time, and is only applicable on flat surfaces. i.e. stepping within the internal areas of the part cannot be removed easily. Sanding off also has the disadvantage of affecting the dimensions of the part.

Figure 3C:
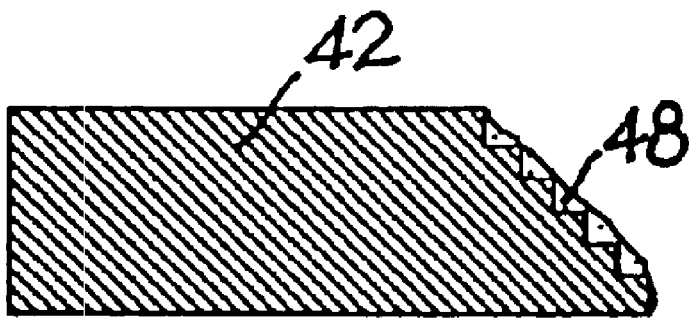

Referring to FIG. 3C and in accordance with the present invention, a hardener 48 is provided to built up the surface of the part 42 to create a smooth surface, rather than to remove parts of the steps 44, as typically done in the prior art. This is achieved by filling the voids 50 between the steps to create a smooth slope. The hardener used to coat the surface of the part should therefore be of sufficient viscosity to remain on the surface and to fill any depressions causing the roughness on the surface. An example of a suitable hardener is an epoxy mixture. The most preferred material is acrylate oligomer and multi-functional acrylate monomers cured by exposure to UV light. Table 2 below gives an example of how the smoothening step may be performed.

TABLE 2

| Hardener | 80% UV lacquer Stargloss GLA 2298 in ethanol, obtained from SICPA Singapore Pte Ltd, Jurong, Singapore. |
|---|---|
| Process | The uncured hardener is layered onto the part by brushing. Curing: 10–60 seconds in the recommended UV-curing machine at 80 w/cm$^2$ or 3–5 hours under full sunlight |
| Resulting Part | Surface roughness (Ra) of 0.2–0.7 $\mu$m |

The UV lacquer given in Table 2 produces a transparent, colorless coating of up to 0.1 mm thick. Due to the thickness of the coating, the voids in the steps are filled. To produce a coloured part, an additional colour pigment, recommended for use with the same UV lacquer, may be added and cured as described above. No distortion or melting of the infiltrated part has been observed after undergoing the smoothening process.

Sanding

Although the UV lacquer produces a smoothened part, there is certain unevenness of thickness, particularly if brushing is used to apply the hardener. Thus, an optional sanding step is recommended. In the most preferred embodiment, sanding is performed with two grades of sand paper with a finer grade following a coarser grade. One example is grade 240 followed by 1200 for smoothened parts coated with the UV lacquer as described above. Sanding also helps to reduce the thickness caused by the hardener coating. A very smooth surface with surface roughness value (Ra) of 0.02 μm may be obtained.

Spray Lacquer

The surface finish after sanding remains very dull. If a high glossy surface finish is desired, a second lacquer is sprayed onto the surface. Different types of common lacquer may be used, for example, TS-13 clear lacquer from Tamiya Corporation, Japan. The preferred method of application is by spraying with a fine nozzle spray gun, e.g. 0.3 to 0.5 mm nozzle size. The sprayed part is then allowed to air-dry. An alternative method is by brushing. Depending on the type of lacquer used, the surface roughness as a result of the spray lacquer step can increase by up to 0.8 μm. Nevertheless, since the surface roughness has been substantially reduced during the smoothening and sanding steps, the increase in roughness contributed by the lacquer coating step is still within the range for surface finish of an injection molded glossy part.

Colored Finish

The surface finishing according to the present invention may be changed from transparent to other colours through various ways. These include:

1. Mixing suitable dyes into the UV lacquer (typically available from the same supplier) such that the colour is provided directly in hardener coating. e.g. Lablestar UV opaque yellow.
2. Mixing suitable dyes into the lacquer (typically available from the same supplier) such that the colour is provided in lacquer coating. e.g.Duplo Yellow Pigment from HEK GmbH.
3. Spray painting of commonly available paint using a fine nozzle spray Tamiya colour semigloss black with nozzle size of 0.3 mm.

A combination of two or more of the above methods may also be used. After the spray painting process, other common processes, such as cubic printing (to give wood grain finish), Tampon printing or letter stanza transfer may be performed to provide graphics work.

Surface Texturing

If texturing is also desired for the finished part, techniques such as sand blasting may be performed on the high glossy part before or after the color finishing step. In an alternative embodiment, several layers of paint are sprayed onto the high glossy part to provide both the colour and the texture to the final surface.

Tables 3–5 contain examples to illustrate various combinations of techniques that can be used according to the present invention. Table 3 shows the process to produce a rapid prototype that meets the texture MT-1055-2, according to Mold Tech Standard with a roughness (Rz) requirement of 16 μm±10%. The roughness (Rz) that was achieved by treating a sample through the process described in Table 3 was 14.47 μm.

TABLE 3

| TECHNIQUE | STARTING MATERIAL | PROCESS |
| --- | --- | --- |
| Selective laser sintering | Duraform Nylon Powder, | Sintering in Sinterstation 2000 to form porous part e.g. smart card holder casing |
| Infiltration | polyurethane (PU) R-9639 from Neorez, USA | Soaking part in PU for 10 minutes |
| Smoothening | UV lacquer Stargloss GLA 2298 | 1. Apply onto prescribe surface using a brush. 2. Cure in UV chamber for 12 seconds |
| Spray painting | Tamiya Semi-gloss black | 1. Spray three consecutive coating of paint using 0.3 mm nozzle spray. 2. Dry paint under ambient conditions. 3. Spray vigorously at a distance of about 40–60 cm. 4. Dry paint under ambient conditions. |

Table 4 below shows the process to achieve a MT-11004 texture according to the industrial standard from Mold Tech. The roughness (Rz) requirement of MT-11004 is 6.782 μm+10%. The roughness achieved using the process described in Table 4 was 7.3 μm. The Part produced looked exactly like the industrial standard.

TABLE 4

| TECHNIQUE | STARTING MATERIAL | PROCESS |
| --- | --- | --- |
| Selective laser sintering | Duraform Nylon Powder | Sintering in Sinterstation 2000 to form porous part e.g. car alarm casing 25 × 30 mm |
| Infiltration | polyurethane (PU) R9639 from Neorez, country? | Soaking part in PU for 10 minutes |
| Smoothening | UV lacquer Stargloss GLA2298 | 1. Apply onto prescribe surface using a brush. 2. Cure in [machine name] for 20 seconds |
| Spray painting | Tamiya semi-gloss black | 1. Spray three consecutive coating of paint using 0.5 mm nozzle spray. 2. Dry paint under ambient conditions. |
| Sand blasting | Aluminum oxide 60 mesh | Sand blast at 30–40 psi for 20 seconds |

Table 5 shows the steps to provide a rapid prototype of a handphone cover with a high glossy, grey finish.

TABLE 5

| TECHNIQUE | STARTING MATERIAL | PROCESS |
| --- | --- | --- |
| Selective laser sintering | Duraform Nylon Powder | Sintering in Sinterstation 2000 to form porous part |
| Infiltration | Neorez R9629 polyurethane (PU) | Soaking part in PU for 15 minutes |

TABLE 5-continued

| TECHNIQUE | STARTING MATERIAL | PROCESS |
|---|---|---|
| Smoothening | Stargloss GLA 2298 UV lacquer | Brushing onto prescribe surface and radiate in UV chamber for 15 seconds |
| Sanding | 1. Sand paper grade 240 | 1. Sand for 20 minutes |
|  | 2. Sand paper grade 1200 | 2. Sand for 10 minutes |
| Lacquer coating | Tamiya clear Lacquer | Spray at 30 mm distance & allow to dry. Repeat spraying at 30 mm distance & allow to dry. |

For non-porous plastics, the same process as described above may be used, except that the PU infiltration step may be omitted.

From the description and examples discussed above, it is appreciated that many variations in methods and products are possible based on the teachings disclosed herein. It is contemplated that many changes and modifications may be made by one of ordinary skill in the art without departing from the spirit and the scope of the invention described.

What is claimed is:

1. A method of treating a porous plastic rapid prototype having a rough surface with miniature steps to obtain a desired surface appearance, said method comprising:

a) infiltrating the pores of said plastic prototype with a curable polymer;

b) curing said polymer to form an infiltrated surface on said plastic prototype with a surface roughness (Ra) of 7–10 μm;

c) applying an external coating of a curable polymeric hardener, on said Infiltrated surface, said hardener having sufficient viscosity to remain on said infiltrated surface end to fill up said miniature steps to form a surface without said miniature steps: and d) curing said hardener to obtain a matt surface with surface roughness (Re) of 0.2–0.7 μm.

2. A method according to claim 1 further comprising:

e) sanding, with at least one grade of abrasive, said matt surface to further reduce said surface roughness (Ra) of 0.2–0.7 μm.

3. A method according to claim 2 further comprising:

f) applying a layer of lacquer on said matt surface to obtain a glossy surface.

4. A method according to claim 3 whereby said lacquer may be coloured.

5. A method according to claim 3 further comprising:

g) printing on said glossy surface to apply graphics to said glossy surface.

* * * * *

UNITED STATES PATENT AND TRADEMARK OFFICE
CERTIFICATE OF CORRECTION

PATENT NO. : 6,800,324 B2
DATED : October 5, 2004
INVENTOR(S) : Kong Fok Chong et al.

It is certified that error appears in the above-identified patent and that said Letters Patent is hereby corrected as shown below:

Column 3,
Line 25, delete "D™" and substitute therefor -- DTM --.

Column 8,
Line 8, delete "Infiltrated" and substitute therefor -- infiltrated --.
Line 10, delete "end" and substitute therefor -- and --.
Line 13, delete "(Re)" and substitute therefor -- (Ra) --.

Signed and Sealed this

Twenty-second Day of February, 2005

JON W. DUDAS
*Director of the United States Patent and Trademark Office*